(12) United States Patent
Sun et al.

(10) Patent No.: US 6,873,496 B1
(45) Date of Patent: Mar. 29, 2005

(54) SIDE RAIL SLIDER HAVING IMPROVED FLY HEIGHT CONTROL

(75) Inventors: Biao Sun, Fremont, CA (US); Pablo Levi, Sunnyvale, CA (US)

(73) Assignee: Western Digital Fremont, Inc., Fremont, CA (US)

(*) Notice: Subject to any disclaimer, the term of this patent is extended or adjusted under 35 U.S.C. 154(b) by 0 days.

(21) Appl. No.: 09/476,189

(22) Filed: Jan. 3, 2000

(51) Int. Cl.$^7$ ................................................ G11B 5/60
(52) U.S. Cl. ................................................... 360/236.2
(58) Field of Search ........................... 360/230, 234.3, 360/235.4, 236.1, 236.2, 236.3, 236.4, 236.5, 236.6, 236.7, 236.8, 236.9, 236, 235.7, 235.8

(56) References Cited

U.S. PATENT DOCUMENTS

| | | |
|---|---|---|
| 4,081,846 A | 3/1978 | Roscamp et al. |
| 4,218,715 A | 8/1980 | Garnier |
| 4,636,894 A | 1/1987 | Mo |
| 4,670,806 A | 6/1987 | Ghose |
| 4,802,042 A | 1/1989 | Strom |
| 5,198,934 A | 3/1993 | Kubo et al. |
| 5,274,518 A | 12/1993 | Chapin et al. |
| 5,327,311 A | 7/1994 | Ananth et al. |
| 5,343,343 A | 8/1994 | Chapin et al. |
| 5,572,386 A | 11/1996 | Ananth et al. |
| 5,610,784 A | 3/1997 | Dorius et al. |
| 5,705,287 A | 1/1998 | Doerner et al. |
| 5,726,831 A | 3/1998 | White |
| 5,739,981 A | 4/1998 | Cha et al. |
| 5,768,055 A | 6/1998 | Tian et al. |
| 5,781,376 A | 7/1998 | Tsukamoto |
| 6,034,842 A * | 3/2000 | Cha ........................ 360/235.6 |
| 6,137,656 A * | 10/2000 | Levi et al. ............... 360/235.4 |
| 6,144,528 A * | 11/2000 | Anaya-Dufresne et al. ...... 360/235.4 |
| 6,333,835 B1 * | 12/2001 | Kang et al. ............... 360/235.4 |
| 6,490,135 B1 * | 12/2002 | Sannino et al. .......... 360/235.8 |
| 2002/0075601 A1 * | 6/2002 | Koishi ...................... 360/236.2 |

* cited by examiner

*Primary Examiner*—David Ometz
*Assistant Examiner*—Mark Blouin
(74) *Attorney, Agent, or Firm*—Joshua C. Harrison, Esq.; Milad G. Shara, Esq.; Haynes Beffel & Wolfeld

(57) ABSTRACT

A slider is disclosed for use with a magnetic data recording system such as that used in computer systems. The slider has an improved air bearing design which allows placement of the read and write elements at an edge of the slider, while maintaining stable fly height at the location of the read and write sensors. Placing the read and write elements allows more of the surface area of the disk to be used by allowing the head to perform correctly while reading and writing data right up to the edge of the disk. Stable fly height of the slider is achieved by using a single pad at a corner of the trailing edge, the pad having the read and write elements therein. A stable flight profile is maintained through use of asymmetrical rails disposed longitudinally along lateral sides of the slider.

36 Claims, 9 Drawing Sheets

FLY HEIGHT VARIATION AT READ / WRITE SENSORS
PER DEGREE OF ROLL STATIC ATTITUDE

|  | ZONE 1 | ZONE 2 | ZONE 3 | ZONE 4 |
|---|---|---|---|---|
| PRESENT INVENTION ONE PAD SLIDER | 1.52 % | 3.71 % | 10.91 % | 18.74 % |
| PRIOR ART TWO PAD SLIDER | 25.01 % | 22.85 % | 22.00 % | 25.81 % |

FIG. 4

SIDE RAIL SLIDER HAVING IMPROVED FLY HEIGHT CONTROL

BACKGROUND OF THE INVENTION

Field of the Invention

The present invention relates to sliders for use with magnetic data recording and retrieval systems and more particularly to air bearings for use on such sliders.

Magnetic disk drives are used to store and retrieve data for digital electronic apparatus such as computers. In FIGS. 1A and 1B, a magnetic disk data storage system 10 of the art is illustrated which includes a sealed enclosure 12 and a plurality of magnetic disks 14 each of which has an upper surface 16 and a lower surface 18. The disks are supported for rotation by a spindle 20 of a motor 22.

An actuator 24 includes an E-block 25 having at its distal end a plurality of actuator arms 26. The actuator also includes a bearing 27 which mounts the actuator 24 pivotally within the enclosure 12 and further includes a voice coil 28 at its proximal end. The voice coil is disposed between a pair of magnets 30 which are fixedly connected with respect to the enclosure 12. Generating an electrical current in the coil 28 induces a magnetic field about the coil. Interaction between the magnetic fields of the coil 28 and the magnets 30 provides a desired, controlled pivotal movement of the actuator about a pivot point 31 of the bearing 27.

The actuator arms 26 support a plurality of suspensions 32, each of which supports at its distal end a slider 34a, 34b. Each suspension holds its corresponding slider in close proximity to a surface of one of the disks 14 to facilitate reading and recording data to and from the disk 14.

The motor 22 and spindle 20 cause the disks 14 to rotate. As the disks 14 rotate, the air immediately adjacent the disks moves with the disks as a result of friction and the viscosity of the air. Thus moving air passes between each of the sliders 34b, 34a and its adjacent disk surface 16, 18 forming an air bearing. This air bearing causes the head to fly a very small distance from the disk surface 16, 18.

With reference to FIG. 1C, the slider is generally in the form of a ceramic block having a leading edge 36 a trailing edge 38, first and second lateral sides 40, 42 opposite one another, and an air bearing surface generally referred to as 44. The air bearing surface includes first and second laterally opposed rails 46, 48. Each rail 46, 48 has an inward turning foot portion 50, 52 at its end closest to the leading edge 36 of the slider 34. The foot portions 50, 52 define therebetween a channel 54. A pad 56 is formed on the air bearing surface 44, located at the trailing edge 38 of the slider 34 centrally between the lateral sides 40, 42.

The raised surface areas of the rails 46, 48 and pad 56 generate a high pressure area thereunder causing the slider 34 to fly above the disk 14 passing thereunder. The location of highest pressure is located at the forward portion of the pad 56. A cavity 58 defined by the inner edges of the rails 46, 48 aft of the channel 54 generates a relatively low pressure area which provides stability during flight of the slider 34. As will be appreciated with reference to FIG. 1C, the air bearing surface 44 and associated rails 46, 48 and pad 56 are symmetrical about a longitudinal axis, centrally located between the sides 40, 42. As the slider 34 flies, any roll experienced will be about this centrally located longitudinal axis. As will be appreciated, any such roll will have relatively little effect on the fly height at the central location of the pad 56.

With reference to FIGS. 1D and 1E, each of the sliders 34 has within it a read element 60 and a write element 62. As the disk surface 16 or 18 moves past the slider 34 the write element 62 generates a magnetic field leaving magnetic data on the passing disk 14. Such write elements are generally in the form of an electrical coil 64 passing through a magnetic yoke 66. As a current passes through the coil 64 it induces a magnetic field which in turn generates a magnetic flux in the yoke 66. A gap 68 in the yoke causes the magnetic flux in the yoke to generate a magnetic field which fringes out from the gap 68. Since the gap is purposely located adjacent the disk, this magnetic fringing field imparts magnetic data onto the passing magnetic disk 14. The coil 64 is embedded within a dielectric material 70 which electrically isolates it from the yoke 66. An insulating layer 72 covers the entire write element 60.

With continued reference to FIGS. 1D and 1E, to read data from a disk 14 the read element 60 detects changes in surrounding magnetic fields caused by the disk 14 passing thereby. Several read elements may be used to read such data. A very effective read element currently in use is a GMR Spin Valve sensor 74. Such sensors take advantage of the changing electrical resistance exhibited by some materials when a passing magnetic field affects the magnetic orientation of adjacent magnetic layers. At its most basic level, a GMR spin valve includes a free magnetic layer and a pinned magnetic layer separated by a non-magnetic layer such as copper. The pinned layer has magnetization which is pinned in a pre-selected direction. On the other hand, the free layer has a direction of magnetization which is perpendicular with the pinned layer, but is free to move under the influence of an external magnetic field such as that imparted by a passing magnetic recording medium. As the angle between the magnetic directions of the free and pinned layers changes, the electrical resistance through the sensor changes as well. By sensing this change in electrical resistance, the magnetic signal passing by the read element can be detected. The sensor 74 is embedded within a dielectric layer 76, between a shield 78 and the yoke 66 of the write element 62.

With reference now to FIG. 1F, in order to take advantage of a greater amount of available disk surface area for data recording, manufacturers have used a side rail slider 80. Similar to the earlier described slider 34, the side rail slider 80 has a leading edge 82, a trailing edge 84 and first and second lateral sides 86, 88. The side rail slider also has first and second rails 90, 92. The side rail slider 80 differs from the previously described slider 34 in that the side rail slider 80 has a pair of pads 94, 96 which are located at opposite lateral sides 86, 88 of the slider 34 along its trailing edge 84. The read and write elements 60, 62 are located in one of the pads along a lateral side of the slider 34. This is advantageous in that it allows data to be recorded and read right up to the outer edge of the disk which would not be possible if the read and write elements 60, 62 were located centrally on the slider.

However, since the slider has a generally uniform configuration, the roll axis of the slider runs longitudinally along the center of the slider 34. This means that as the slider 34 rolls during flight, the fly height of the slider at the read and write elements 60, 62 will change, resulting in degraded performance. Therefore there remains a need for an air bearing design for a slider which will allow data to be read right up to the edge of the disk while maintaining a relatively constant fly height at the locations of the read and write element.

SUMMARY OF THE INVENTION

The present invention provides a slider, having an improved air bearing surface, for use in a data recording and retrieval system. The slider is generally block shaped, having a leading edge, a trailing edge opposite the leading edge and first and second opposing lateral sides. The air bearing surface includes a single pad located at a corner at the trailing edge of the slider. A read element and a write element are embedded within the slider at the location of the pad. The air bearing surface also includes first and second rails which run lengthwise along a portion of each lateral side. The rails are asymmetric with respect to one another in order to compensate for the fact that there is only one pad, located at a single corner of the trailing edge.

The single pad at the trailing edge of the slider is the area of highest pressure on the air bearing surface. By having only one pad, the location of the roll axis is essentially shifted toward the pad as well as the read and write elements. Therefore, the fly height of the slider at the location of the read and write elements is less affected by roll, providing improved performance. This benefit is realized while also allowing the fullest possible use of the recording disk surface area by having the read and write elements at the edge of the slider.

By configuring the rails such that the rail located at the side opposite the pad has greater surface area than the other rail, a stable flight profile can be maintained in spite of the asymmetrical pressure profile at the trailing edge caused by the asymmetrical pad placement. Testing has revealed significant improvement (roughly an order of magnitude improvement) through use of the air bearing design of the present invention.

BRIEF DESCRIPTION OF THE DRAWINGS

The present invention will be readily understood by the following detailed description in conjunction with the accompanying drawings, with like reference numerals designating like elements of the background art.

FIG. 4 is a tabular illustration of performance improvements exhibited by the present invention;

DETAILED DESCRIPTION OF THE PREFERED EMBODIMENTS

Figure 1A:
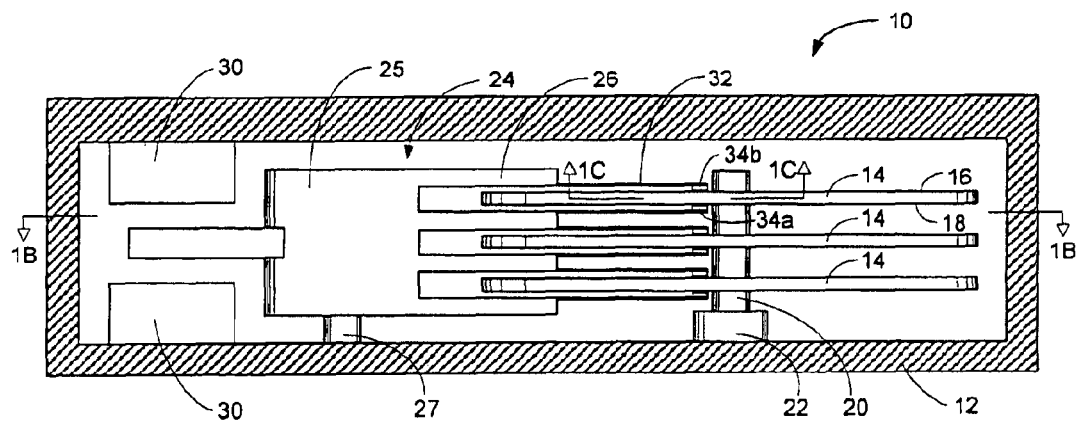
FIG. 1A is a partial cross-sectional front elevation view of a magnetic data storage system.
Figure 1B:
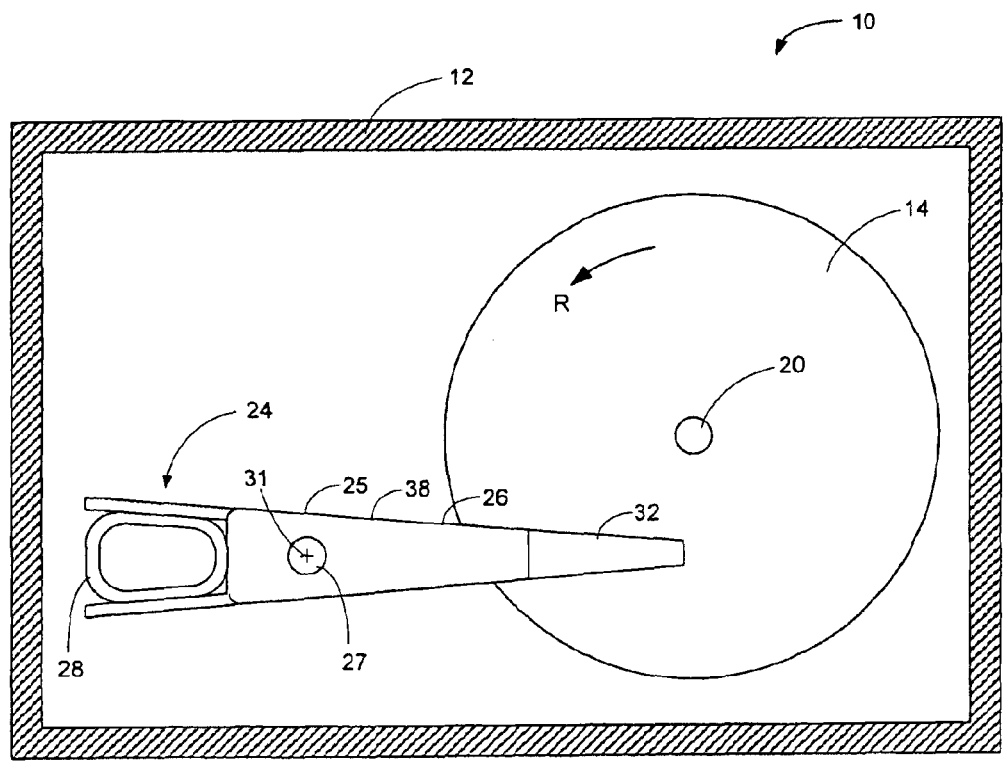
FIG. 1B is a top plan view taken along line 1B—1B of FIG. 1A.
Figure 1C:
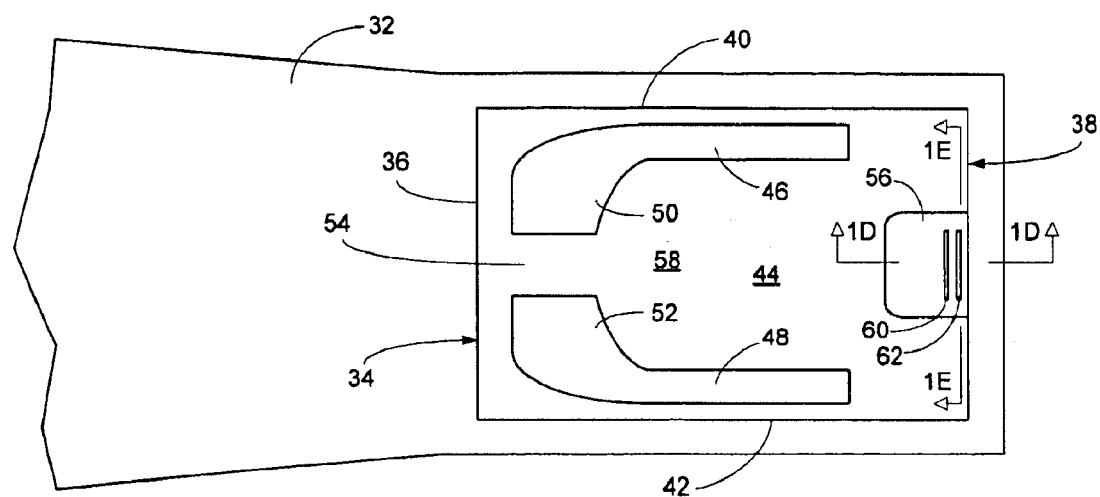
FIG. 1C is a view taken from line 1C—1C of FIG. 1A, shown enlarged.
Figure 1D:
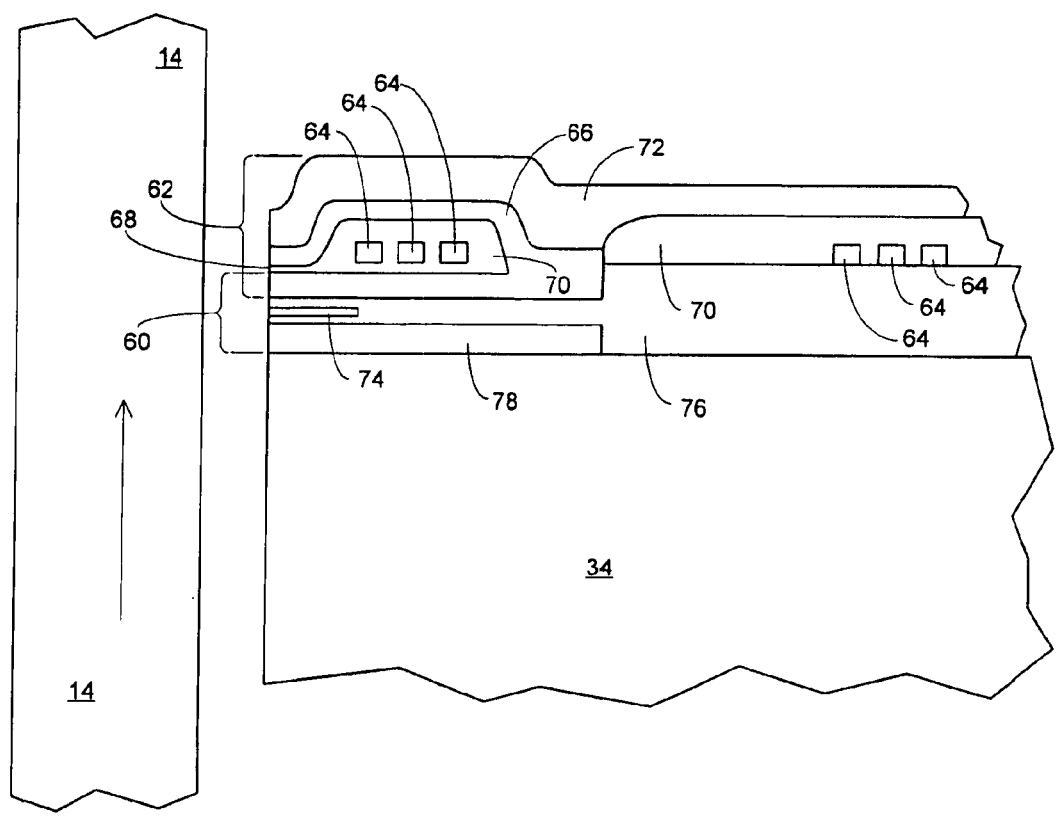
FIG. 1D is a view taken from line 1D—1D of FIG. 1C, shown enlarged.
Figure 1E:
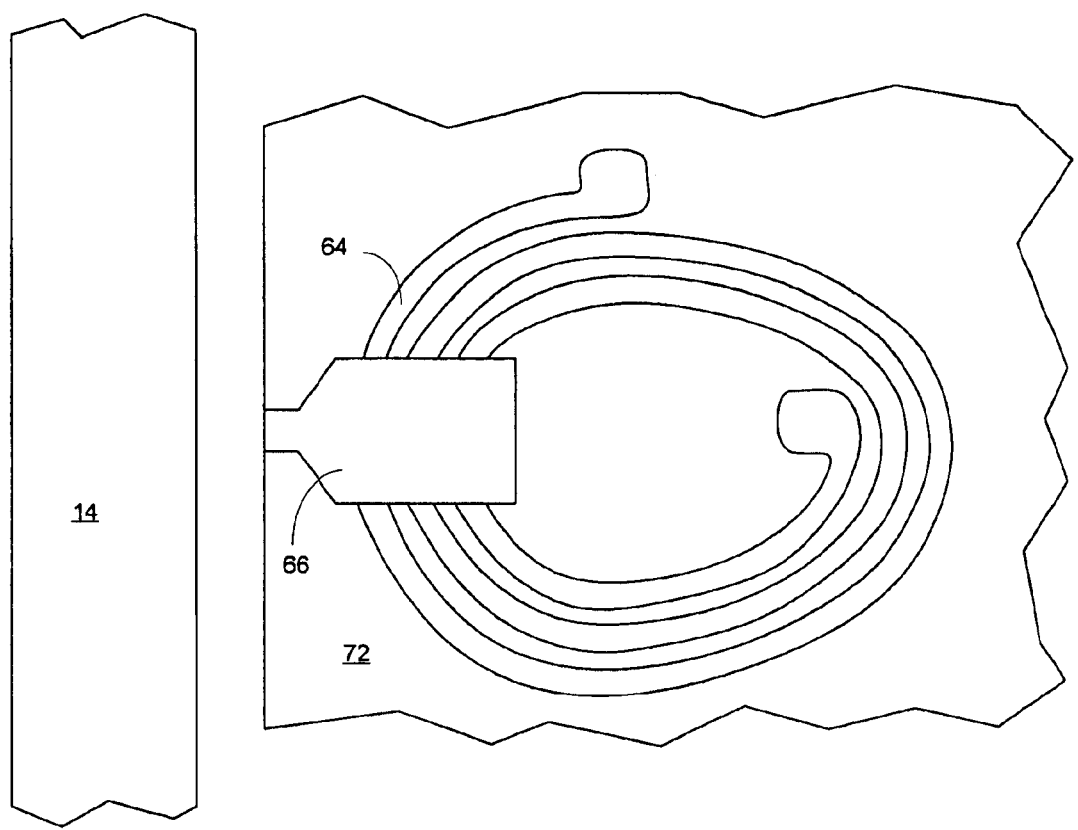
FIG. 1E is a view taken from line 1E—1E of FIG. 1C, shown enlarged.
Figure 1F:
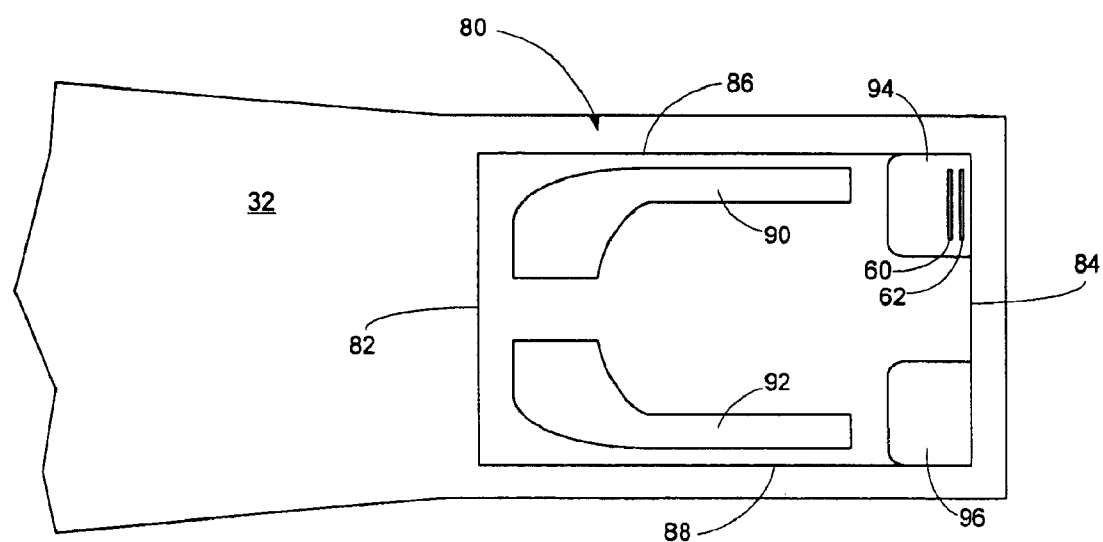
FIG. 1F is a view similar to view 1C—1C.
Figure 2:
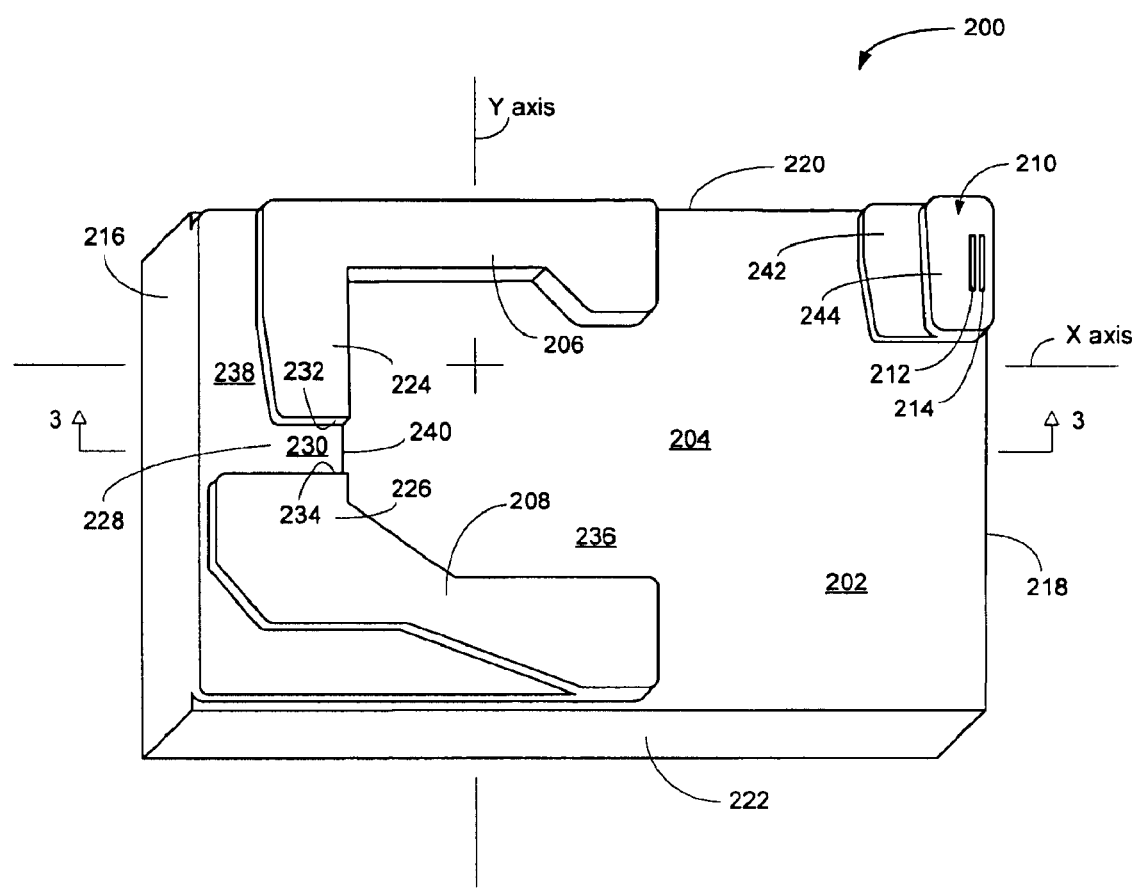
FIG. 2 is a perspective view of a slider of the present invention.

With reference to FIG. 2, the present invention is embodied in a slider generally referred to as 200 for use in a data recording and retrieval system 10 (FIGS. 1A, 1B). The slider 200 includes an air bearing surface 202 having improved fly height stability performance for reading and writing data onto a magnetic disk 14 (FIGS. 1A, 1B). The air bearing surface 202 includes a base surface 204. Extending from the base surface 204 are a first rail 206, a second rail 208 and a pad 210.

With continued reference to FIG. 2, the slider has embedded therein a magneto-resistive read element 212 and a magneto-resistive write element 214. The slider 200 is generally block shaped, having a leading edge 216 and a trailing edge 218. A first lateral side 220 and a second lateral side 222 opposite the first lateral side 220 both extend from the leading edge 216 to the trailing edge 218.

The leading edge of the slider 200 defines a proximal end, while the trailing edge defines the distal end. The first and second rails 206, 208 are both generally doglegged in shape, each rail having a proximal foot portion 224, 226 which turns toward the other rail. The foot portions 224, 226 define therebetween a channel 228 having a floor 230 and first and second laterally opposing side walls 232, 234.

With further reference to FIG. 2, the first and second rails 206, 208 define therebetween a cavity 236. The cavity 236 is bounded at its proximal end by the foot portions 224, 226 of the rails 206, 208, and is bounded at its lateral sides by the inner walls of the rails 206, 208. The cavity 236 has an open distal end.

The air bearing surface 202 of the slider 200 includes an intermediate surface 238 having a height which is between that of the base surface 204 and the surface of the first and second rails 206, 208. The intermediate surface 238 extends from the leading edge 216 to the proximal edge of the of the foot portions 224, 226 of the rails 206, 208. The intermediate surface 238 also extends to the distal end of the channel 228, forming the floor 230 of the channel. The intermediate surface 238 terminates at the distal end of the channel 228 to form a shoulder 240 where the intermediate surface drops down to the base surface 204 at the proximal end of the cavity 236. In the preferred embodiment, the intermediate surface 238 extends along the outer proximal edge of the second rail 208 tapering toward the second lateral side 222 of the slider to terminate at a point midway along the length of the second rail 208.

With reference still to FIG. 2, the pad 210 has a first level 242 having a surface at generally the same elevation as the intermediate surface 238. The first level steps up to a second level 244 which has a surface at generally the same height as the surface of the rails 206, 208. The first level 4) 242 of the pad 210 is disposed proximal to the second level 244 of the pad 210. The second level of the pad extends generally to the trailing edge 218 of the slider 200. The read element 212 and write element 214 are embedded within the slider 218 at the pad 210 at the trailing edge 218 of the slider 200. The read and write elements 212 and 214 extend into the slider 200 in a direction perpendicular to the air bearing surface 202 with the ends of the read and write elements 212, 214 extending to the surface of the second level 244 of the slider.

With continued reference to FIG. 2, the pad 210 is located at a corner of the air bearing surface 202 which is defined by the juncture of the trailing edge 218 and the first lateral side 220. The base surface 204 extends essentially flat and smooth from the pad 210 to the corner defined by the juncture of the trailing edge 218 and the second lateral side 222, there being no other pad located between the pad 210 and the lateral side 222.

Figure 3:
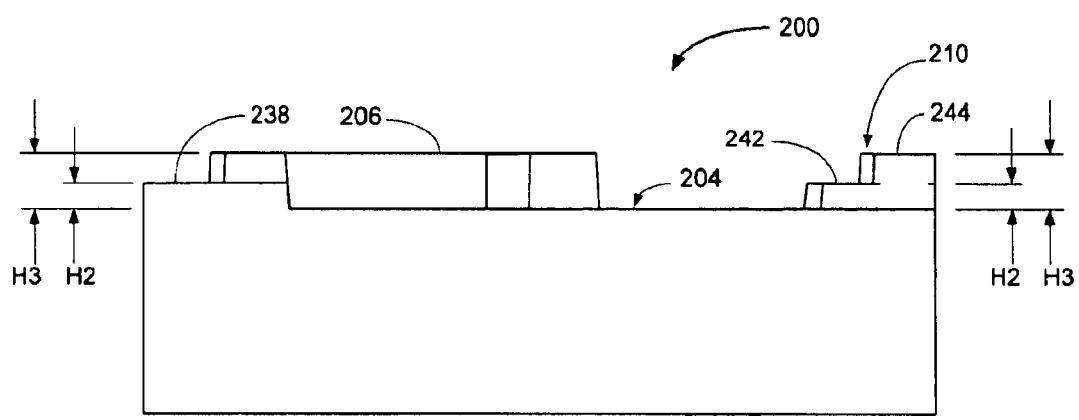
FIG. 3 is a side cross sectional view taken from line 3—3 of FIG. 2.

With reference now to FIG. 3, the entire air bearing surface 202 can be considered to consist of three basic height elevations. The base surface 204 defines the first elevation and serves as a reference point for the other two elevations. As can be seen with reference to FIG. 3, the second elevation extends to a height of H2 from the base surface 204. This second elevation includes the first level portion 242 of the pad 210 and the intermediate surface 238. The third elevation rises to a height H3 from the base surface and includes the second level 244 of the pad 210 as well as the first and second rails 206, 208.

With reference again to FIG. 2, during use, the disk 14 (FIGS. 1A, and 1B) will pass in close proximity to the air bearing surface 202 causing air to flow over the air bearing surface in the direction from the leading edge 216 to the trailing edge 218. As air flows over the air bearing surface, the air flowing over the raised areas of the rails 206, 208 and the pad 210 has relatively high pressure, causing the slider 200 to fly over the disk. The cavity 236 is a low pressure area which gives the slider 200 stability in its flight. The channel 228, prevents the cavity 236 from generating too great a relative vacuum which would cause the slider to effectively stick to the disk during lift off, possibly damaging the system 10.

With continued reference to FIG. 2, the slider is affected by movement in three axes of motion. Roll is defined as movement about a longitudinal axis X, and pitch is defined as movement about a lateral axis Y. With a pivot point being the intersection of these axes. The point (not shown) at which the slider 200 attaches to the suspension 32 (FIG. 1A) is the gram load position.

As will be appreciated by those skilled in the art, moving the read and write sensors 212 and 214 to the edge of the slider increases the useful space on the disk 14 (FIG. 1) from which data can be read and written. Furthermore, it is desirable to maintain, as much as possible, a constant fly height at the location of the read and write elements. Prior art systems having read and write elements disposed near a side of the slider have maintained stable flight by including a pad at both corners of the trailing edge. The first pad in such a system contained the read and write elements while the other pad balanced the high pressure generated by the first pad. The X or roll axis of such a slider was therefore maintained near the center of the slider. Such sliders exhibit the undesirable property that the read and write elements 212, 214 are disposed away from the X or roll axis. Therefore, as the slider rolls during flight the distance between the read and write elements and the disk varies.

With continued reference to FIG. 2, by moving the pad 210 to the first side 220 of the slider and by having no other pad located at the trailing edge 218 of the slider 200, the pad 210 effectively becomes closer to the pivot point. As will be appreciated by those skilled in the art, the pad 210 is the location of highest pressure on the air bearing surface 202. This can be analogized as a slider supported at the trailing edge by one stiff spring at one corner rather than by two relatively soft springs at two corners. The roll axis X is essentially shifted toward the side at which the pad 210 is located.

Since there is only one pad 210 located at one corner of trailing edge 218 of the slider, the rails 206, 208 are formed to be asymmetric. The second rail 208 is created to have a larger surface area than the first rail 206, thereby balancing the slider and maintaining a stable flight profile.

With reference to FIG. 4, the improved flight performance of the present invention can be more fully appreciated. Testing has revealed that the present invention greatly reduces fly height variation due to roll static attitude variation. FIG. 4 shows the percentage change in fly height per degree of roll at various test zones. The fly height is measured at the location of the read and write elements, 212, 214. The test zones represent different locations on a disk 14 on which the slider 200 was tested. As can be seen in most zones, an order of magnitude improvement is obtained over a prior art slider having two pads at the trailing edge.

Figure 5:
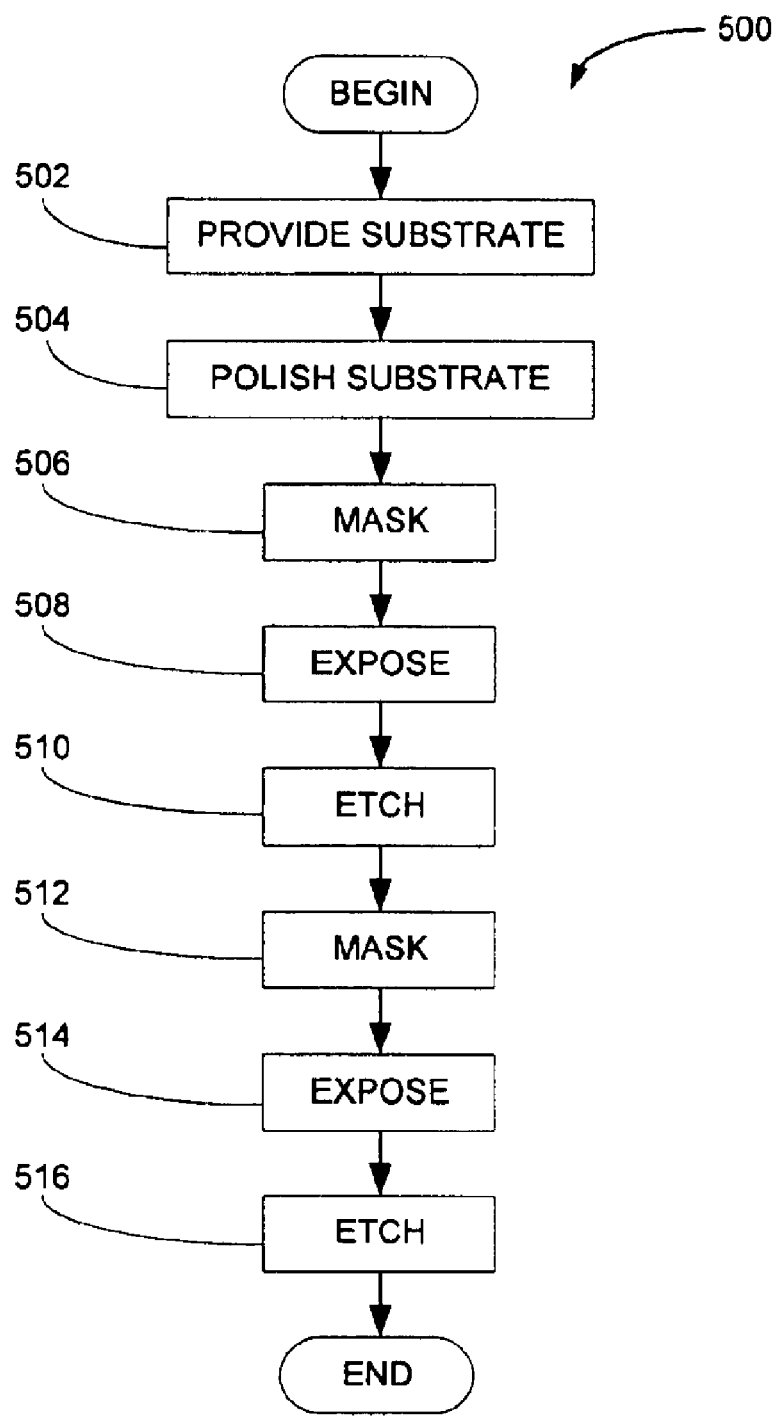
FIG. 5 is a diagram of a process for constructing a head of the present invention.

With reference to FIG. 5, a process 500 for manufacturing the slider 200 of the present invention begins with a step 502 of providing a ceramic substrate. By way of example, the ceramic substrate can be constructed of $Al_2TiC_3$, which in a step 504 is polished to provide a smooth flat surface. Then in a step 506, the polished substrate is masked to reveal the pattern of the rails 206, 208 and the second level 244 of the pad 210. In a step 508, according a reverse lithographic process familiar to those skilled in the art, the slider is exposed, hardening the patterned rails 206, 208 and pad 210. Subsequently, in a step 510 the slider is etched, removing material to form the rails 206, 208 and the second level 244 of the pad 210. Thereafter, in a step 512, the slider is masked again to reveal the entire pad 210 as well as the rails 206, and the intermediate surface 238. In a step 514, the slider is again exposed to harden the portions of the slider 200 revealed by the masking. Then, in a step 516, the slider is etched again to form the intermediate surface 238 and the first level 242 of the pad by removing material down to the level of the base surface 204.

What is claimed is:

1. A system for reading and recording data, the system comprising:

an enclosure;

a magnetic disk rotationally mounted within said enclosure;

an actuator pivotally mounted within said enclosure and having a distal end adjacent a surface of said magnetic disk;

a slider connected with said distal end of said actuator in close proximity to said surface of said magnetic disk, said slider having a leading edge, a trailing edge opposite said leading edge, and first and second opposing sides, the slider having a generally longitudinal roll axis about which roll rotation of the slider may occur;

a base surface on said slider at a first elevation, said base surface extending to a corner defined by the intersection of said trailing edge and said second side;

a first rail defined by a raised surface extending from said base surface to a first raised elevation and extending generally lengthwise adjacent said first side of said slider from a location proximal to said leading edge;

a second rail defined by a raised surface extending from said base surface to said first raised elevation and extending generally lengthwise adjacent said second side of said slider from a location proximal said leading edge;

a pad extending from said base surface at a corner defined by the intersection of said trailing edge and said first side;

an intermediate surface formed at an elevation between said base surface and said raised elevations of said first and second rails, said intermediate surface extending between said rails and said leading edge and extending between a portion of said first and second rails;

a magneto-resistive read element disposed within said slider at the location of said pad; and a magneto-resistive write element disposed within said slider, adjacent said read element at the location of said pad;

whereby the roll axis is situated toward the pad.

2. A system as recited in claim 1 wherein said first and second rails are asymmetric with respect to one another.

3. A system as recited in claim 2 wherein said second rail has a greater surface area than said first rail.

4. A system as recited in claim 1 wherein said pad has more than one level.

5. A slider for use in a magnetic data recording system, the slider comprising:
a substrate having a leading edge, a trailing edge opposite said leading edge, first and second opposing sides and a base surface, the slider having a generally longitudinal roll axis about which roll rotation of the slider may occur;
a pad extending from said base surface proximal to a corner defined by the juncture of said first side and said trailing edge, said base surface extending to a corner defined by the juncture of said second side and said trailing edge;
a first rail defined by a raised surface extending lengthwise along a portion of said base surface adjacent said first side;
a second rail defined by a raised surface extending lengthwise along said base surface adjacent said second side;
a magneto-resistive read element disposed within said substrate at said pad; and
a magneto-resistive write element disposed within said substrate at said pad;
whereby the roll axis is situated toward the pad.

6. A slider as recited in claim 5 further comprising an intermediate surface having an elevation between that of said base surface and that of said rails, said intermediate surface extending from said rails to said leading edge and extending between a portion of said rails.

7. A slider as recited in claim 5 wherein said first and second rails are asymmetrical with one another.

8. A slider as recited in claim 5 wherein said second rail has a greater surface area than said first rail.

9. A slider as recited in claim 5 wherein said pad has first and second levels said second level having a greater elevation from said base surface than said first level, and said first level steps up to said second level.

10. A slider as recited in claim 9 wherein said first level is positioned on said pad to be opposite said trailing edge with respect to said second level.

11. A slider as recited in claim 5 wherein said intermediate surface terminates at a location between said rails to define a shoulder extending from said first rail to said second rail.

12. A slider as recited in claim 5, wherein said first and second rails bend to turn toward one another at their ends most proximal to said leading edge.

13. A slider as recited in claim 12 wherein said turned in portions of said rails define there between a channel.

14. A slider for use in a data recording and retrieval system, the slider comprising:
a substrate having a proximal end, a distal end, first and second opposing sides, and a base surface bounded by said proximal and distal ends and said first and second sides, the slider having a generally longitudinal roll axis about which roll rotation of the slider may occur;
a raised surface extending from said base surface extending from a location near said proximal end to a location between said proximal and distal ends;
said raised surface having a recessed inner portion defining a cavity opening toward its distal end;
a pad extending from said base surface located proximal to said distal end and one of said first and second sides, said base surface extending to said other side toward said distal end of said substrate;
a read element disposed within said substrate at said pad; and
a write element disposed within said substrate at said pad;
whereby the roll axis is situated toward the pad.

15. A slider as recited in claim 14 further comprising a channel having laterally opposed sides and a floor, formed in said raised surface, and extending from the proximal end of said raised portion to said recessed portion.

16. A slider as recited in claim 15 further wherein said floor of said channel extends above said base surface and forms a shoulder with said recessed portion, said shoulder extending laterally from said first channel side to said second channel side.

17. A slider as recited in claim 14 wherein said pad has multiple levels, each level being progressively higher than the one before it as they proceed toward the distal end of the substrate.

18. A slider as recited in claim 14 wherein said base surface is generally flat as it proceeds toward the distal end of the substrate at the side opposite said pad.

19. A system for reading and recording data, the system comprising:
an enclosure;
a magnetic disk rotationally mounted within said enclosure;
an actuator pivotally mounted within said enclosure and having a distal end adjacent a surface of said magnetic disk;
a slider connected with said distal end of said actuator in close proximity to said surface of said magnetic disk, said slider having a leading edge, a trailing edge opposite said leading edge, and first and second opposing sides;
a base surface on said slider at a first elevation, said base surface extending to a corner defined by the intersection of said trailing edge and said second side;
a first rail defined by a raised surface extending from said base surface to a first raised elevation and extending generally lengthwise adjacent said first side of said slider from a location proximal to said leading edge;
a second rail defined by a raised surface extending from said base surface to said first raised elevation and extending generally lengthwise adjacent said second side of said slider from a location proximal said leading edge;
a pad extending from said base surface at a corner defined by the intersection of said trailing edge and said first side, there being no additional pad extending from said base surface in the area of said base surface between said pad and a corner defined by the intersection of said trailing edge and said second side;
an intermediate surface formed at an elevation between said base surface and said raised elevations of said first and second rails, said intermediate surface extending between said rails and said leading edge and extending between a portion of said first and second rails;
a magneto-resistive read element disposed within said slider at the location of said pad; and
a magneto-resistive write element disposed within said slider, adjacent said read element at the location of said pad.

20. A system as recited in claim 19 wherein said first and second rails are asymmetric with respect to one another.

21. A system as recited in claim 20 wherein said second rail has a greater surface area than said first rail.

22. A system as recited in claim 19 wherein said pad has more than one level.

23. A slider for use in a magnetic data recording system, the slider comprising:
   a substrate having a leading edge, a trailing edge opposite said leading edge, first and second opposing sides and a base surface;
   a pad extending from said base surface proximal to a corner defined by the juncture of said first side and said trailing edge, said base surface extending to a corner defined by the juncture of said second side and said trailing edge, there being no additional pad extending from said base surface in the area of said base surface between said pad and a corner defined by the intersection of said trailing edge and said second side;
   a first rail defined by a raised surface extending lengthwise along a portion of said base surface adjacent said first side;
   a second rail defined by a raised surface extending lengthwise along said base surface adjacent said second side;
   a magneto-resistive read element disposed within said substrate at said pad; and
   a magneto-resistive write element disposed within said substrate at said pad.

24. A slider as recited in claim 23 further comprising an intermediate surface having an elevation between that of said base surface and that of said rails, said intermediate surface extending from said rails to said leading edge and extending between a portion of said rails.

25. A slider as recited in claim 23 wherein said first and second rails are asymmetrical with one another.

26. A slider as recited in claim 23 wherein said second rail has a greater surface area than said first rail.

27. A slider as recited in claim 23 wherein said pad has first and second levels said second level having a greater elevation from said base surface than said first level, and said first level steps up to said second level.

28. A slider as recited in claim 27 wherein said first level is positioned on said pad to be opposite said trailing edge with respect to said second level.

29. A slider as recited in claim 23 wherein said intermediate surface terminates at a location between said rails to define a shoulder extending from said first rail to said second rail.

30. A slider as recited in claim 23, wherein said first and second rails bend to turn toward one another at their ends most proximal to said leading edge.

31. A slider as recited in claim 30 wherein said turned in portions of said rails define there between a channel.

32. A slider for use in a data recording and retrieval system, the slider comprising:
   a substrate having a proximal end, a distal end, first and second opposing sides, and a base surface bounded by said proximal and distal ends and said first and second sides;
   a raised surface extending from said base surface extending from a location near said proximal end to a location between said proximal and distal ends;
   said raised surface having a recessed inner portion defining a cavity opening toward its distal end;
   a pad extending from said base surface located proximal to said distal end and one of said first and second sides, said base surface extending to said other side toward said distal end: of said substrate, there being no additional pad extending from said base surface in the area of said base surface between said pad and a corner defined by the intersection of said trailing edge and said second side;
   a read element disposed within said substrate at said pad; and
   a write element disposed within said substrate at said pad.

33. A slider as recited in claim 32 further comprising a channel having laterally opposed sides and a floor, formed in said raised surface, and extending from the proximal end of said raised portion to said recessed portion.

34. A slider as recited in claim 33 further wherein said floor of said channel extends above said base surface and forms a shoulder with said recessed portion, said shoulder extending laterally from said first channel side to said second channel side.

35. A slider as recited in claim 32 wherein said pad has multiple levels, each level being progressively higher than the one before it as they proceed toward the distal end of the substrate.

36. A slider as recited in claim 32 wherein said base surface is generally flat as it proceeds toward the distal end of the substrate at the side opposite said pad.

\* \* \* \* \*